United States Patent
Pramod

(10) Patent No.: US 11,411,515 B1
(45) Date of Patent: Aug. 9, 2022

(54) OPEN LOOP COMPENSATION OF CURRENT HARMONICS INDUCED BY PARAMETER IMBALANCE

(71) Applicant: STEERING SOLUTIONS IP HOLDING CORPORATION, Saginaw, MI (US)

(72) Inventor: Prerit Pramod, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/175,596

(22) Filed: Feb. 12, 2021

(51) Int. Cl.
*H02P 6/10* (2006.01)
*H02K 19/04* (2006.01)

(52) U.S. Cl.
CPC ............... *H02P 6/10* (2013.01); *H02K 19/04* (2013.01)

(58) Field of Classification Search
CPC . H02P 29/50; H02P 21/05; H02P 6/10; H02K 19/04; G05B 2219/41453
See application file for complete search history.

(56) References Cited

U.S. PATENT DOCUMENTS

| | | | | |
|---|---|---|---|---|
| 6,426,602 B1* | 7/2002 | McCann | ................ | B62D 5/046 318/284 |
| 8,344,680 B2* | 1/2013 | Kitanaka | ................ | H02P 21/22 318/632 |
| 2012/0268046 A1* | 10/2012 | Yamazaki | ............... | H02P 21/26 318/400.02 |
| 2021/0336567 A1* | 10/2021 | Pramod | .................. | H02P 21/22 |

FOREIGN PATENT DOCUMENTS

| | | | | |
|---|---|---|---|---|
| CA | 2667025 C | * | 5/2012 | ............. H02P 27/04 |
| DE | 112019000887 T5 | * | 10/2020 | ............. H02P 27/12 |
| WO | WO-2011128695 A2 | * | 10/2011 | ............... G05B 5/01 |

OTHER PUBLICATIONS

Jahns, et al., Pulsating torque minimization techniques for permanent magnet AC motor drives—A review, IEEE Trans. Ind. Electron., vol. 43, No. 2, pp. 321-330, Apr. 1996.
Yanhui, et al., Torque Ripple Minimization Using Online Estimation of the Stator Resistances With Consideration of Magnetic Saturation, IEEE Trans. Ind. Electron., vol. 61, No. 9, pp. 5105-5114, Sep. 2014.

* cited by examiner

*Primary Examiner* — Bickey Dhakal
(74) *Attorney, Agent, or Firm* — Dickinson Wright PLLC

(57) ABSTRACT

A method for compensating parameter imbalance induced current harmonics in a synchronous motor drive includes receiving a command current signal corresponding to a generated command current. The method also includes receiving a position estimate signal indicating an estimated position of the synchronous motor drive and, in response to at least one current harmonic being induced by a parameter imbalance, determining a voltage adjustment value using the command current signal and the position estimate signal. The method also includes generating a voltage adjustment signal using, at least, the voltage adjustment value, the voltage adjustment signal being applied to the synchronous motor drive to compensate for the current harmonics induced by the parameter imbalance.

20 Claims, 6 Drawing Sheets

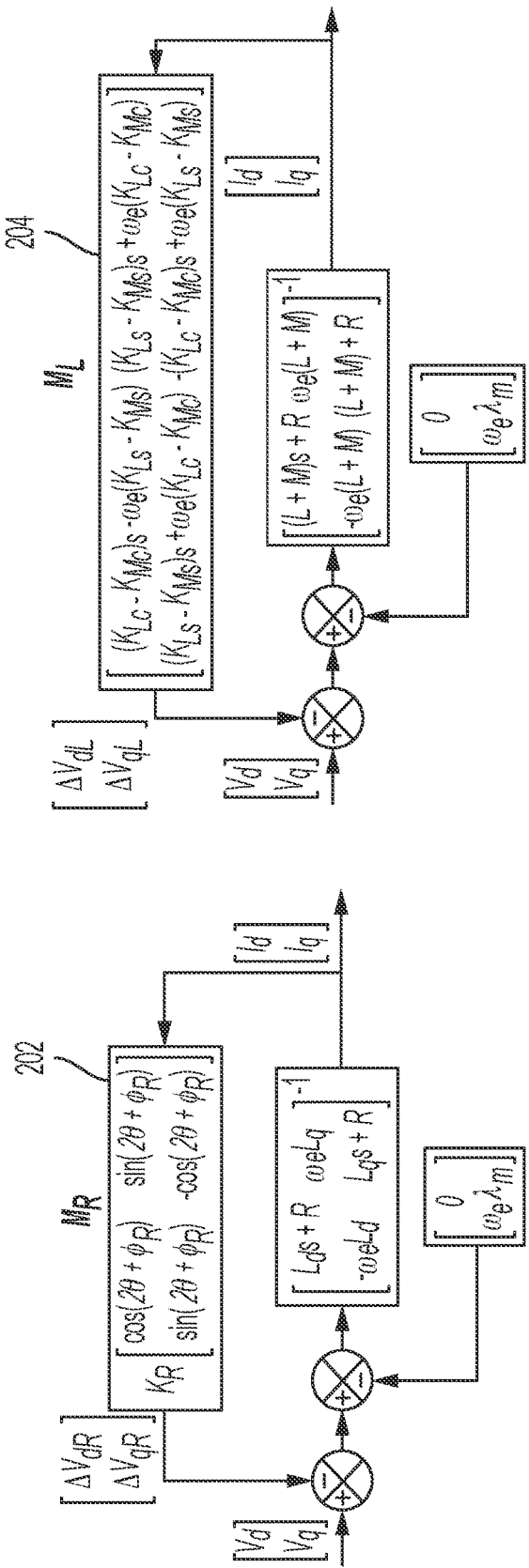
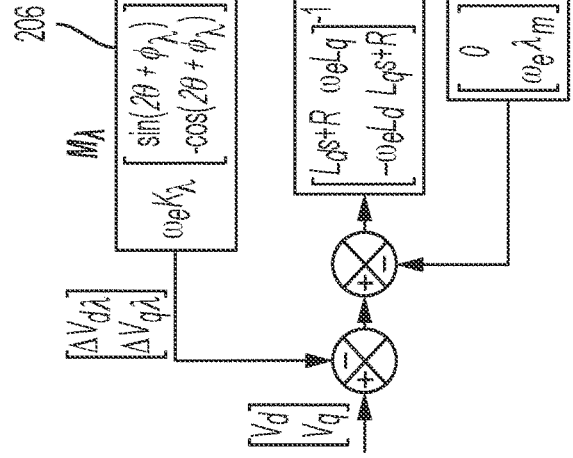
FIG. 2A
FIG. 2B
FIG. 2C

OPEN LOOP COMPENSATION OF CURRENT HARMONICS INDUCED BY PARAMETER IMBALANCE

TECHNICAL FIELD

This disclosure relates to electric motors and in particular to systems and methods for open loop (feedforward) compensation of current harmonics induced by parameter imbalances in synchronous motor drives.

BACKGROUND OF THE INVENTION

Vehicles, such as cars, trucks, sport utility vehicles, crossovers, mini-vans, marine craft, aircraft, all-terrain vehicles, recreational vehicles, or other suitable vehicles, may include an electric power steering (EPS) system. Such EPS systems typically include an electric motor for providing steering assist during operation of a vehicle. To provide such steering assist, the EPS system may drive the electric motor according to a method of torque control. Typically, electric motor drive applications utilizing synchronous machines may be susceptible to parameter imbalances during manufacturing and/or during operation. Such inter-phase parameter imbalance may cause the generation of undesirable current and torque pulsations during operation of the synchronous motor drive.

Typically, to reduce and/or minimize inter-phase parameter imbalance, such electric machines may be designed and configured according to requirements and/or regulations to satisfy minimal part-to-part variation. This is especially true for high performance motion control applications that are noise, vibration, and harshness (NVH) sensitive, particularly ones involving mass manufacturing, such as EPS. Stringent requirements specifying that the machines satisfy a minimal part-to-part variation may be costly. This necessitates the need for development of control techniques that enable mitigation of current harmonics generated responsive to parameter imbalances in synchronous motors.

SUMMARY OF THE INVENTION

This disclosure relates generally to feedforward compensation of current harmonics induced by parameter imbalances in synchronous motor drives.

An aspect of the disclosed embodiments includes a system for compensating parameter imbalance induced current harmonics in an electric motor. The system includes a processor and a memory. The memory includes instructions that, when executed by the processor, cause the processor to: receive a command current signal corresponding to a generated command current; receive a position estimate signal indicating an estimated position of the electric motor; in response to at least one current harmonic being induced by a parameter imbalance, determine a voltage adjustment value using the command current signal and the position estimate signal; and generate a voltage adjustment signal using, at least, the voltage adjustment value, the voltage adjustment signal being applied to the electric motor to compensate for the current harmonics induced by the parameter imbalance.

Another aspect of the disclosed embodiments includes a method for compensating parameter imbalance induced current harmonics in a synchronous motor drive. The method includes receiving a command current signal corresponding to a generated command current. The method also includes receiving a position estimate signal indicating an estimated position of the synchronous motor drive and, in response to at least one current harmonic being induced by a parameter imbalance, determining a voltage adjustment value using the command current signal and the position estimate signal. The method also includes generating a voltage adjustment signal using, at least, the voltage adjustment value, the voltage adjustment signal being applied to the synchronous motor drive to compensate for the current harmonics induced by the parameter imbalance.

Another aspect of the disclosed embodiments includes an apparatus. The apparatus includes a processor and a memory. The memory includes instructions that, when executed by the processor, cause the processor to: receive a command current signal corresponding to a generated command current; receive a position estimate signal indicating an estimated position of an electric motor; in response to at least one current harmonic being induced by a parameter imbalance, determine a voltage adjustment value using the command current signal and the position estimate signal; and generate a voltage adjustment signal using, at least, the voltage adjustment value, the voltage adjustment signal being applied to the electric motor to compensate for the current harmonics induced by the parameter imbalance.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 2A-2C generally illustrate block diagrams for mathematical models used to detect parameter imbalance induced current harmonics according to principles of the present disclosure.

DETAILED DESCRIPTION

Figure 1:
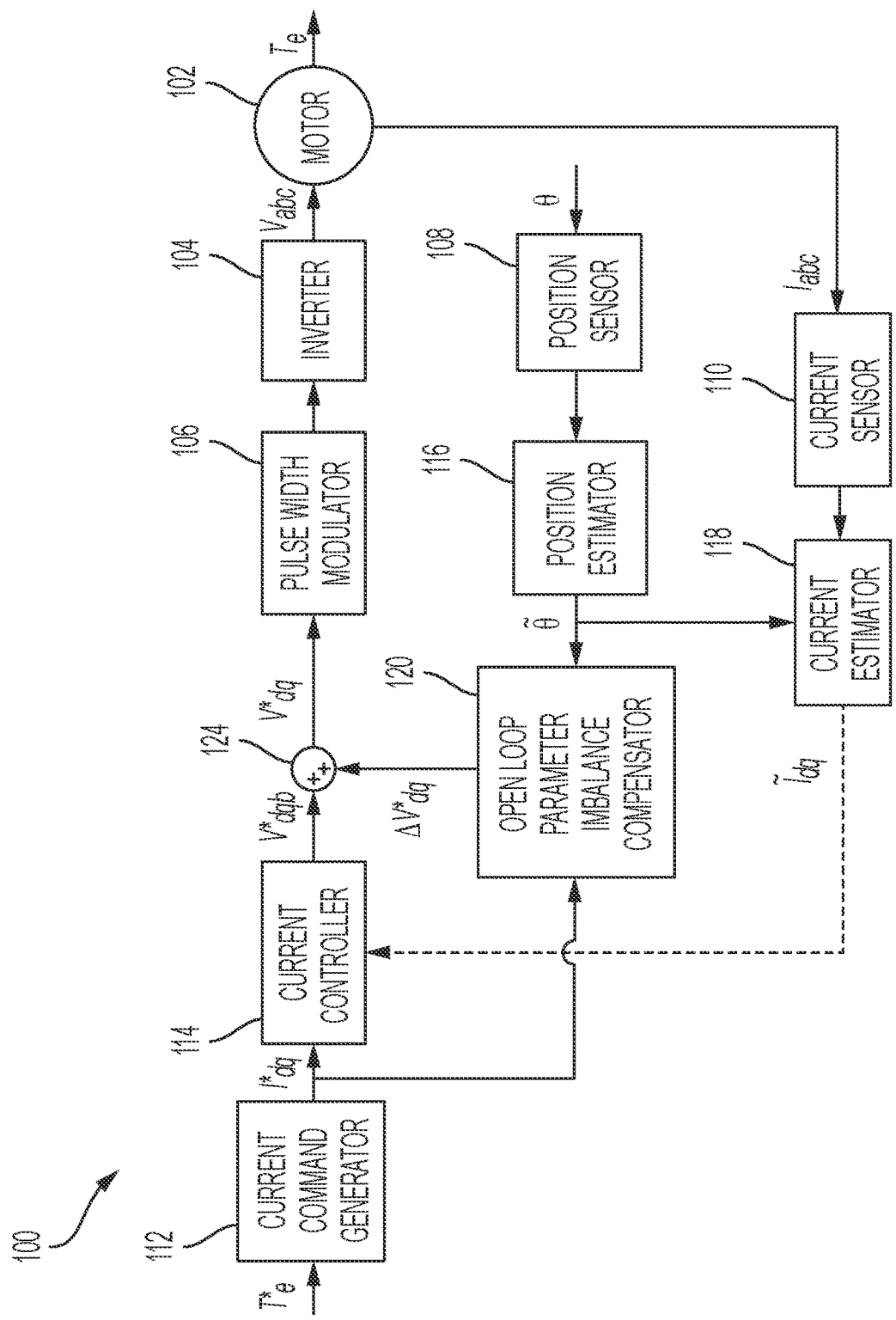
FIG. 1 generally illustrates a synchronous motor drive system with feedforward model-based compensation of current harmonics induced by parameter imbalances according to principles of the present disclosure.

The following discussion is directed to various embodiments of the disclosed subject matter. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, marine craft, aircraft, all-terrain vehicles, recreational vehicles, or other suitable vehicles, may include an electric power steering (EPS) system. Such EPS systems typically include an electric motor for providing steering assist during operation of a vehicle. To provide such steering assist, the EPS system may drive the electric motor according to a method of torque control. Typically, electric motor drive applications utilizing synchronous machines may be susceptible to parameter imbalances during manufacturing and/or during operation. Such inter-phase parameter imbalance may cause the generation of undesirable current and torque pulsations during operation of the synchronous motor drive.

To reduce and/or minimize inter-phase parameter imbalance, some requirements and/or regulations specify that such electric machines satisfy minimal part-to-part variation. This is especially true for high performance motion control applications that are NVH sensitive, particularly ones involving mass manufacturing, such as an EPS. Stringent requirements specifying that the machines satisfy a minimal part-to-part variation may be costly. This necessitates the need for development of control techniques that enable mitigation of current harmonics generated responsive to parameter imbalances in synchronous motors.

As will be described, motion control applications (e.g., vehicles, boats, airplanes, drones, power equipment, yard equipment, pumps, compressors, and the like) utilizing synchronous motor drives may be susceptible to parameter imbalances during manufacturing and/or during operation. For example, a motor drive, converter, and/or other circuitry may experience a parameter imbalance.

High performance motion control system applications, particularly ones involving mass manufacturing such as EPS, may be subject to stringent NVH requirements and may specify minimal part-to-part variation. Parameter imbalance(s) that are left uncorrected in such systems may result in a degradation of the overall system performance. However, enforcing tight tolerance on the allowable parameter imbalances on the manufacturing side and/or on the production side of synchronous motors may be expensive. Further, the overall system performance degradation may reduce the longevity of the synchronous motors, and/or may reduce the likelihood that a customer may purchase an EPS system that includes the synchronous motor. As a result, it is desirable to compensate or correct the current harmonics produced responsive to such parameter imbalances.

Certain non-linear effects, such as temperature variation or failure modes may result in a significant change in the behavior of a machine. For example, motor winding involves placing wires of a synchronous motor of the synchronous machine within coils that are closed around a coated flexible magnetic core. During a process to wind the wires (e.g., a phase winding process), an attempt is made to wind the wires such that wires corresponding to each respective phase (e.g., phase a, phase b, and phase c) are wound such that resistance is equal.

However, temperature changes driven by heat created during the phase winding process may cause a resistance imbalance in one or more of the phases. Consequently, detection, identification, and/or correction of such non-linear effects may be beneficial for improving performance of synchronous machines utilizing synchronous motor drives. Furthermore, while systems consisting of a feedback control structure are inherently capable of reducing these effects to an extent, they are typically not designed or tuned specifically for this purpose and are therefore unable to ensure compensation across the entire operating range. Thus, a generalized compensation technique that specifically targets this issue and is compatible with any base control structure is desirable.

Accordingly, systems and methods, such as those described herein, may be configured to address the issues above by providing techniques for open loop or feedforward compensation of current harmonics induced by parameter imbalance in synchronous motor drives. For example, the systems and methods may be configured to receive a current command signal relating to a generated command current and to receive a position estimate signal relating to an estimated position of the synchronous motor. The systems and methods may be configured to determine a voltage adjustment value based on the current command signal and the position estimate signal.

The systems and methods may be configured to generate a voltage adjustment signal corresponding to the determined voltage adjustment value. Furthermore, the voltage adjustment signal may be applied to the electric motor to compensate for the current harmonics induced by the parameter imbalance. For example, the voltage adjustment signal may be added with a base command voltage signal (e.g., which is generated by a base current controller) to form a final command voltage signal. The final command voltage signal may then be provided to the motor via a pulse width modulator and converter. This may result in the reduction and/or elimination of harmonics caused by inter-phase parameter imbalance in the current generated by the motor.

In some embodiments, the systems and methods described herein may be configured to provide techniques for real-time compensation of inter-phase parameter imbalance in synchronous motor drives.

The systems and methods described herein are configured to provide at least the benefits of detecting and identifying any type of parameter imbalance in a synchronous motor. The systems and methods described herein are applicable for various synchronous machine configurations (e.g., permanent magnet or wound rotor synchronous machines, non-salient pole or salient pole machines, multiphase machines, etc.). Further, the systems and methods described herein may be implemented by a processor for real-time correction of current harmonics induced by parameter imbalances while the synchronous motor is being operated. Additionally, the systems and methods described herein compensate for current harmonics induced by parameter imbalance without having to be configured to rely on (e.g., receive) a command voltage signal and/or an estimated (e.g., or measured) current as input to the system. In this way, the systems and methods are able to efficiently and effectively compensate for the parameter imbalance in an open loop or feed-forward manner without impacting the stability or performance of the base, and therefore the overall, motor current (and torque) control system.

FIG. 1 generally illustrates a synchronous motor drive system 100 (referred to herein as the system 100) with compensation of current harmonics induced by parameter imbalances according to principles of the present disclosure. The system 100 may include a motor 102 (e.g., a synchronous motor, etc.), an inverter 104, a pulse width modulator 106, a position estimator 116, a current sensing component 110, a current command generator 112, a current controller 114, a position estimator 116, a current estimator 118, and a parameter imbalance compensator 120. It should be understood that the system 100 may include additional or fewer components than those described herein.

In some embodiments, the system 100 may include one or more parameter imbalance compensators 120. A parameter imbalance compensator 120 may include an electronic control unit (ECU) and/or any other suitable controller. The parameter imbalance compensator 120 may be configured to control, for example, various aspects of a vehicle, such as aspect of the system 100, aspects of an electronic power steering (EPS) system, and/or the like. Use of the term "compensation" in the parameter imbalance compensator 120 is not intended to limit the types of implementable controllers in any way. Rather, the term "compensation" is used to add clarity in distinguishing the parameter imbalance compensator 120 and the current controller 114.

In some embodiments, the parameter imbalance compensator 120 may include a processor 121 and a memory 122. The processor 121 may include any suitable processor, such as those described herein. Additionally, or alternatively, the parameter imbalance compensator 120 may include any suitable number of processors, in addition to or other than the processor 121. The memory 122 may comprise a single disk or a plurality of disks (e.g., hard drives), and includes a storage management module that manages one or more partitions within the memory 122. In some embodiments, memory 122 may include flash memory, semiconductor (solid state) memory or the like. The memory 122 may include Random Access Memory (RAM), a Read-Only Memory (ROM), or a combination thereof. The memory 122 may include instructions that, when executed by the processor 121, cause the processor 121 to, at least, control various functions of the system 100.

The motor 102 may generate rotational or linear force used to power a machine, such as those described herein. The motor 102 may be a synchronous motor or any other type of suitable motor. In some embodiments, various components of the system 100 may be used as part of a synchronous motor drive (e.g., current controller 114, pulse width modulator 106, inverter 104, and/or the like). The synchronous motor drive may be an electronic device that controls the electrical energy sent to the motor 102. The synchronous motor drive may provide voltage to the motor 102 in varying amounts and at varying frequencies, thereby indirectly controlling the current and torque of the motor 102.

In some embodiments, as will be described, one or more components of the system 100 may perform open loop or feedforward compensation of the current harmonics induced by parameter imbalance.

In some embodiments, the current controller 114, the pulse width modulator 106, the inverter 104, and the motor 102 may form a feedforward current control system.

In some embodiments, the current controller 114, the pulse width modulator 106, the inverter 104, the motor 102, the current sensing component 110, and the current estimator 118 form a feedback current control system.

With the foregoing described, additional details and operation of the system 100 will now be discussed. In some embodiments, the current command generator 112 may receive a commanded electromagnetic torque $T_e^*$ as an input. The commanded electromagnetic torque may be input by a user using a computing device, may be preprogrammed for the motor 102, and/or may be received via another suitable method. The current command generator 112 may generate a commanded current $I_{dq}^*$ based on the commanded electromagnetic torque. The current command may be composed of a direct axis (d-axis) $I_d^*$ and a quadrature axis (q-axis) $I_q^*$ current component. In some embodiments, the current controller 114 may receive the commanded current $I_{dq}^*$ from the current command generator 112. In some embodiments, the current controller 114 may receive the commanded current $I_{dq}^*$ that is input by a user using a computing device.

In some embodiments, the current controller 114 and the parameter imbalance compensator 124 transmit a command base command voltage signal $V_{dqb}^*$ and a voltage adjustment signal $\Delta V_{dq}^*$ respectively to the summation block 124 which generates a final command voltage $V_{dq}$ and transmits it to the pulse width modulator 106. The final command voltage signal, as used herein, may refer to a voltage signal that system 100 assumes to be equal or nearly equal to an actual input voltage applied to the motor 102.

The pulse width modulator 106 may, over a given period of time, control a duration of time when the switches of inverter 102 are turned on and off in accordance with the final command voltage signal to cause the inverter to generate and apply an input voltage $V_{abc}$ to the motor 102. The inverter 104 may be a voltage source inverter, receiving a constant or nearly constant voltage from an external source such as a battery (not shown), and may vary the amplitude, phase and frequency of the voltage provided to the motor 102 to control the current and torque of the motor 102. The motor 102 may use the input voltage $V_{abc}$ to generate an amount of current that may be equal to the commanded current $I_{dq}^*$ or that may vary from the commanded current $I_{dq}^*$ (e.g., when there is a parameter imbalance).

In some embodiments, the motor 102 may provide current $I_{abc}$ to the current sensing component 110. The current sensing component 110 may be configured to detect and measure an electric current in a circuit. The current sensing component 110 may provide signals $\tilde{I}_{abc}$ indicating the current $I_{abc}$ to the current estimator 118. The current estimator 118 may also receive, from the position estimator 116, signals indicative of an electrical (phase) position θ of the motor 102. For example, the position sensing component 108 may sense or measure the instantaneous position of the motor 102 and may provide a signal indicating the position to the position estimator 116. The position estimator 116 may provide the signal $\hat{\theta}$ indicating the phase θ to the current estimator 118. The current estimator 118 may estimate the amount of current output by the motor 102 in the synchronous (or dq) reference frame and transmit the estimated current $\tilde{I}_{dq}$ to the base current controller 114.

In some embodiments, such as when the base current control scheme within the system 100 is configured to be a feedforward type control architecture, the base current controller 114 may be implemented as a feedforward current controller. In this case, the current estimator does not need to transmit the estimated current $\tilde{I}_{dq}$ to the current controller 114 (e.g., the base current controller). Instead, the current controller 114 may receive the commanded current $I_{dq}^*$ from the current command generator 112 and may use the commanded current $I_{dq}^*$ along with an inverse mathematical model of the motor 102 utilizing estimated parameters to generate a base command voltage signal $V_{dqb}^*$ which may be a constant or slowly varying quantity. Additionally, the parameter imbalance compensator 120 may determine the adjustment voltage signal $\Delta V_{dq}^*$ which may be a pulsating (i.e., dependent on the estimated position of the motor) quantity. The final command voltage signal $V_{dq}^*$ computed by the summation block 124 may therefore include a pulsating component in addition to a constant component.

In some embodiments, such as when the base current control scheme within the system 100 is configured to be a feedback type control architecture, the base current controller 114 may be implemented as a current regulator. In this case, the current estimator 118 may provide the current controller 114 (e.g., the current regulator) with the estimated current $\tilde{I}_{dq}$. The current controller 114 may compare the estimated current $\tilde{I}_{dq}$ to the commanded current $I_{dq}^*$. If the current regulator determines that there is a difference between the estimated current $\tilde{I}_{dq}$ and the commanded current $I_{dq}^*$ the current controller 114 may transmit a base command voltage signal $V_{dqb}^*$ to cause the estimated current $\tilde{I}_{dq}$ to track the commanded current $I_{dq}^*$. As such, since the commanded current $I_{dq}^*$ is constant (or slowly varying) and the estimated current $\tilde{I}_{dq}$ equals the commanded current $I_{dq}^*$, then the estimated current $\tilde{I}_{dq}$ is also constant. When the parameter imbalance compensator 120 is disabled, i.e., the adjustment voltage signal $\Delta V_{dq}^*$ is set to zero, the current regulator 114 by virtue of its feedback control structure may generate a pulsating component to minimize the current harmonics caused by parameter imbalance in the motor 102. However, the level of compensation achieved by the feedback control system as well as the range of operating conditions where the compensation is effective without the assistance of the parameter imbalance compensator 120 is significantly limited and is heavily dependent on the structure and tuning of the current regulator 114. Thus, it is desirable to include the parameter imbalance compensator 120 to perform the harmonic compensation, thus reducing the burden on the current regulator and changing its role to one of tracking the base current commands.

In some embodiments, the parameter imbalance compensator 120 may be triggered to determine a voltage adjustment signal that may be used to compensate for the current harmonics induced by parameter imbalance. For example, the parameter imbalance compensator 120 may be triggered to determine a voltage adjustment signal based on one or more operating conditions being satisfied, based on detection of a parameter imbalance signature, based on receiving one or more input signals (e.g., a command current signal, a position estimate signal, etc.), and/or the like.

In some embodiments, the parameter imbalance compensator 120 may determine the voltage adjustment signal $\Delta V_{dq}^*$. For example, the compensator 120 may use a mathematical model representing inter-phase parameter imbalance in the machine to determine the voltage adjustment signal $\Delta V_{dq}^*$ utilizing one or more adjustable compensator parameter values. In this way, the compensator 120 compensates for the current harmonics induced by parameter imbalance in an open loop manner.

FIG. 2A-2C generally illustrate mathematical models of the phenomenon of imbalance or mismatch of the parameters between the individual phases of the machine. FIG. 2A depicts a block 202 that represents resistance imbalance. FIG. 2B includes a block 204 that represents both self and mutual inductance imbalance. FIG. 2C contains a block 206 that represents inter-phase imbalance in the inter-phase permanent magnet (PM) flux linkage. The remaining blocks in FIG. 2A-2C depict the well-known basic (e.g., or average) model of synchronous machines in the dq reference frame. Note that while the mathematical models for imbalance in each of the motor parameters, namely resistance, inductance, and PM flux linkage, are shown individually, they may be combined to obtain a single block diagram that captures them simultaneously.

The following discussion pertains to the derivation of the mathematical models of the machine capturing the phenomenon of inter-phase parameter imbalance and are used subsequently to perform the techniques described herein. A stationary (or abc) reference frame machine model may be expressed as follows:

$$V_a = R_a I_a + \dot{\lambda}_a$$

$$V_b = R_b I_b + \dot{\lambda}_b$$

$$V_c = R_c I_c + \dot{\lambda}_c$$

$$\lambda_a = L_a I_a - M_{ab} I_b - M_{ac} I_c - \lambda_{am} \cos\theta$$

$$\lambda_b = L_b I_b - M_{ba} I_a - M_{bd} I_c - \lambda_{bm} \cos(\theta - \beta)$$

$$\lambda_c = L_c I_c - M_{ca} I_a - M_{cb} I_b - \lambda_{cm} \cos(\theta - 2\beta) \quad (1)$$

where $V_x$, $I_x$, $R_x$, $L_x$, $\lambda_{xm}$ and $\lambda_x$ represent the input voltage, current, resistance, inductance, PM flux linkage and total flux linkage of phase x (where x equals a, b or c) respectively, $M_{xy}$ represents the mutual inductance between phase x and phase y (where x≠y), θ is the electrical position of the motor and β is a constant equal to $$\frac{2\pi}{3}$$

rad. The average synchronous frame model typically used for synchronous machines is derived based on the assumption that each of the motor parameters in each phase are equal. However, this assumption may not be valid in practice particularly in real-time operation, due to non-linear effects including temperature variation and magnetic saturation causing the parameters to be different at one or more of the phases. Accordingly, equation (1) may be modified using the following reference frame transformation shown in equation (2) to generate a synchronous reference frame machine model given in equation (3) that includes the effects of the parameter imbalance:

$$h_{dq0} = H h_{abc} \quad (2)$$

$$H = \frac{2}{3} \begin{bmatrix} \cos\theta & \cos(\theta - \beta) & \cos(\theta - 2\beta) \\ \sin\theta & \sin(\theta - \beta) & \sin(\theta - 2\beta) \\ \frac{1}{2} & \frac{1}{2} & \frac{1}{2} \end{bmatrix}$$

$$V_d = V_{di} + \Delta V_{dR} + \Delta V_{d\lambda} + \Delta V_{dL}$$

$$V_q = V_{qi} + \Delta V_{qR} + \Delta V_{q\lambda} + \Delta V_{qL}$$

$$V_d^i = R I_d + (L + M)(\dot{I}_d + \omega_e I_q) \quad (3)$$

$$V_q^i = R I_q + (L + M)(\dot{I}_q - \omega_e I_d) + \omega_e \lambda_m$$

where h represents either voltage, current or flux linkage, H is the transformation matrix that converts stationary or abc frame quantities to the synchronous or dq reference frame, $V_d$ and $V_q$ are the input motor voltages, $V_d^i$ and $V_q^i$ are the voltage terms associated with the ideal or average synchronous frame motor model, terms $\Delta V_{dR}$ and $\Delta V_{qR}$ include resistance imbalance, $\Delta V_{dL}$ and $\Delta V_{qL}$ incorporate self and mutual inductance imbalance, $\Delta V_{d\lambda}$ and $\Delta V_{q\lambda}$ represent PM flux linkage imbalance, and, while R, L, M and $\lambda_m$ represent the nominal or average values of resistance, self-inductance, mutual-inductance, PM flux linkage respectively and we is the electrical velocity (also referred to as synchronous frequency) of the motor.

Note that equation (3) can be written in a matrix form as follows:

$$V = P^{-1}I + E + \Delta V \quad (4)$$

$$P^{-1} = \begin{bmatrix} (L+M)s+R & \omega_e(L+M) \\ -\omega_e(L+M) & (L+M)s+R \end{bmatrix}$$

$$V = \begin{bmatrix} V_d \\ V_q \end{bmatrix}$$

$$E = \begin{bmatrix} 0 \\ \omega_e \lambda_m \end{bmatrix}$$

$$I = \begin{bmatrix} I_d \\ I_q \end{bmatrix}$$

$$\Delta V = \begin{bmatrix} \Delta V_{dR} + \Delta V_{d\lambda} + \Delta V_{dL} \\ \Delta V_{qR} + \Delta V_{q\lambda} + \Delta V_{qL} \end{bmatrix}$$

where s represents the derivative operator in the frequency domain.

Note that the motor model consists of the transfer matrices that convert the input voltages into the current outputs. Thus, the model of the motor may be written as:

$$I = P(V - E - \Delta V) \quad (5)$$

The resistance imbalance induced voltage terms are expressed as follows:

$$\Delta V_{dR} = K_R(\cos(2\theta + \phi_R)I_d + \sin(2\theta + \phi_R)I_q) \quad (6)$$
$$\Delta V_{dR} = K_R(\sin(2\theta + \phi_R)I_d - \cos(2\theta + \phi_R)I_q)$$

$$\begin{bmatrix} \Delta V_{dR} \\ \Delta V_{dR} \end{bmatrix} = M_R \begin{bmatrix} I_d \\ I_q \end{bmatrix}$$

$$M_R = K_R \begin{bmatrix} \cos(2\theta + \phi_R) & \sin(2\theta + \phi_R) \\ \sin(2\theta + \phi_R) & -\cos(2\theta + \phi_R) \end{bmatrix}$$

$$K_R = \frac{1}{3}\sqrt{\Delta R_a^2 + \Delta R_b^2 + \Delta R_c^2 - \Delta R_a \Delta R_b - \Delta R_b \Delta R_c - \Delta R_c \Delta R_a}$$

$$\phi_R = \tan^{-1}\left(\frac{\sqrt{3}(-\Delta R_b + \Delta R_c)}{2\Delta R_a - \Delta R_b - \Delta R_c}\right) \quad (7)$$

where $\Delta R_x$ represents the deviation of the resistance in phase x from the nominal value R which is the average of the magnitudes of the resistances $R_x$ of the individual phases. The modified motor model that includes the effects of resistance imbalance may be written as follows:

$$I = (P^{-1} + M_R)^{-1}(V - E) \quad (8)$$

Similarly, voltage pulsations in the synchronous reference frame due to inductance imbalance are expressed as follows:

$$\Delta V_{dL} = (K_L\cos(2\theta + \phi_L) - K_M\cos(2\theta + \phi_M))(\dot{I}_d + \omega_e I_q) + \quad (9)$$
$$\quad (K_L\sin(2\theta + \phi_L) - K_M\sin(2\theta + \phi_M))(-\omega_e I_d + \dot{I}_q)$$
$$\Delta V_{qL} = (K_L\sin(2\theta + \phi_L) - K_M\sin(2\theta + \phi_M))(\dot{I}_d + \omega_e I_q) +$$
$$\quad (-K_L\cos(2\theta + \phi_L) + K_M\cos(2\theta + \phi_M))(-\omega_e I_d + \dot{I}_q)$$

$$\begin{bmatrix} \Delta V_{dL} \\ \Delta V_{qL} \end{bmatrix} = \begin{bmatrix} (K_{Lc} - K_{Mc})s - & s(K_{Ls} - K_{Ms}) + \\ \omega_e(K_{Ls} - K_{Ms}) & \omega_e(K_{Lc} - K_{Mc}) \\ (K_{Ls} - K_{Ms})s + & -s(K_{Lc} - K_{Mc}) + \\ \omega_e(K_{Lc} - K_{Mc}) & \omega_e(K_{Ls} - K_{Ms}) \end{bmatrix} \begin{bmatrix} I_d \\ I_q \end{bmatrix}$$

$$K_{Lc} = K_L\cos(2\theta + \phi_L)$$
$$K_{Ls} = K_L\sin(2\theta + \phi_L)$$
$$K_{Mc} = K_M\cos(2\theta + \phi_M)$$
$$K_{Ms} = K_M\sin(2\theta + \phi_M)$$

$$K_L = \frac{1}{3}\sqrt{\Delta L_a^2 + \Delta L_b^2 + \Delta L_c^2 - \Delta L_a \Delta L_b - \Delta L_a \Delta L_c - \Delta L_b \Delta L_c} \quad (10)$$

$$\phi_L = \tan^{-1}\left(\frac{\sqrt{3}(-\Delta L_b + \Delta L_c)}{2\Delta L_a - \Delta L_b - \Delta L_c}\right)$$

$$K_M = \frac{2}{3}\sqrt{\begin{array}{c}\Delta M_{ab}^2 + \Delta M_{bc}^2 + \Delta M_{ca}^2 - \Delta M_{ab}\Delta M_{ac} - \\ \Delta M_{ab}\Delta M_{cb} - \Delta M_{ac}\Delta M_{cb}\end{array}} \quad (11)$$

$$\phi_M = \tan^{-1}\left(\frac{\sqrt{3}(-\Delta M_{ab} + \Delta M_{ac})}{-\Delta M_{ab} - \Delta M_{ac} + 2\Delta M_{cb}}\right)$$

where $\Delta L_x$ represents the deviation of the self-inductance of phase x from the nominal value L which is the average of the self-inductances $L_x$ of the individual phases, $\Delta M_{xy}$ represents the deviation of the mutual-inductance between phases x and y from the nominal value M which is the average of the magnitudes of the mutual-inductances $M_{xy}$ between the three sets of phases.

The modified motor model that includes the effects of inductance imbalance may be written as follows:

$$I = (P^{-1} + M_L)^{-1}(V - E) \quad (12)$$

The pulsating voltage terms due to permanent magnet flux linkage imbalance in the synchronous reference frame are as follows:

$$\Delta V_{d\lambda} = \omega_e K_\lambda \sin(2\theta + \phi_\lambda) \quad (13)$$
$$\Delta V_{q\lambda} = -\omega_e K_\lambda \cos(2\theta + \phi_\lambda)$$

$$\begin{bmatrix} V_{d\lambda} \\ V_{q\lambda} \end{bmatrix} = M_\lambda$$

$$M_\lambda = \omega_e K_\lambda \begin{bmatrix} \sin(2\theta + \phi_\lambda) \\ -\cos(2\theta + \phi_\lambda) \end{bmatrix} \quad (14)$$

$$K_\lambda = \frac{1}{3}\sqrt{\Delta \lambda_a^2 + \Delta \lambda_b^2 + \Delta \lambda_c^2 - \Delta \lambda_a \Delta \lambda_b - \Delta \lambda_b \Delta \lambda_c - \Delta \lambda_c \Delta \lambda_a}$$

$$\phi_\lambda = \tan^{-1}\left(\frac{\sqrt{3}(-\Delta \lambda_b + \Delta \lambda_c)}{2\Delta \lambda_a - \Delta \lambda_b - \Delta \lambda_c}\right)$$

where $\Delta \lambda_x$ represents the deviation of the PM flux linkage magnitude in phase x from the nominal value $\lambda_m$ which is the average of the magnitudes of the PM flux linkages $\lambda_{xm}$ of the individual phases.

The modified motor model that includes the effects of PM flux linkage imbalance may be written as follows:

$$I = P^{-1}(V - E - M_\lambda) \quad (15)$$

From the three sets of equations for flux linkage imbalance, resistance, and inductance it is clear that the effects of the three imbalances are dominant in distinct regions of operation. From the mathematical models, it can be observed that resistance imbalance is dominant at high currents and low speeds, flux linkage imbalance is significant at low current and high speeds, while inductance imbalance becomes prominent when both the current and speeds are significant.

Figure 3:
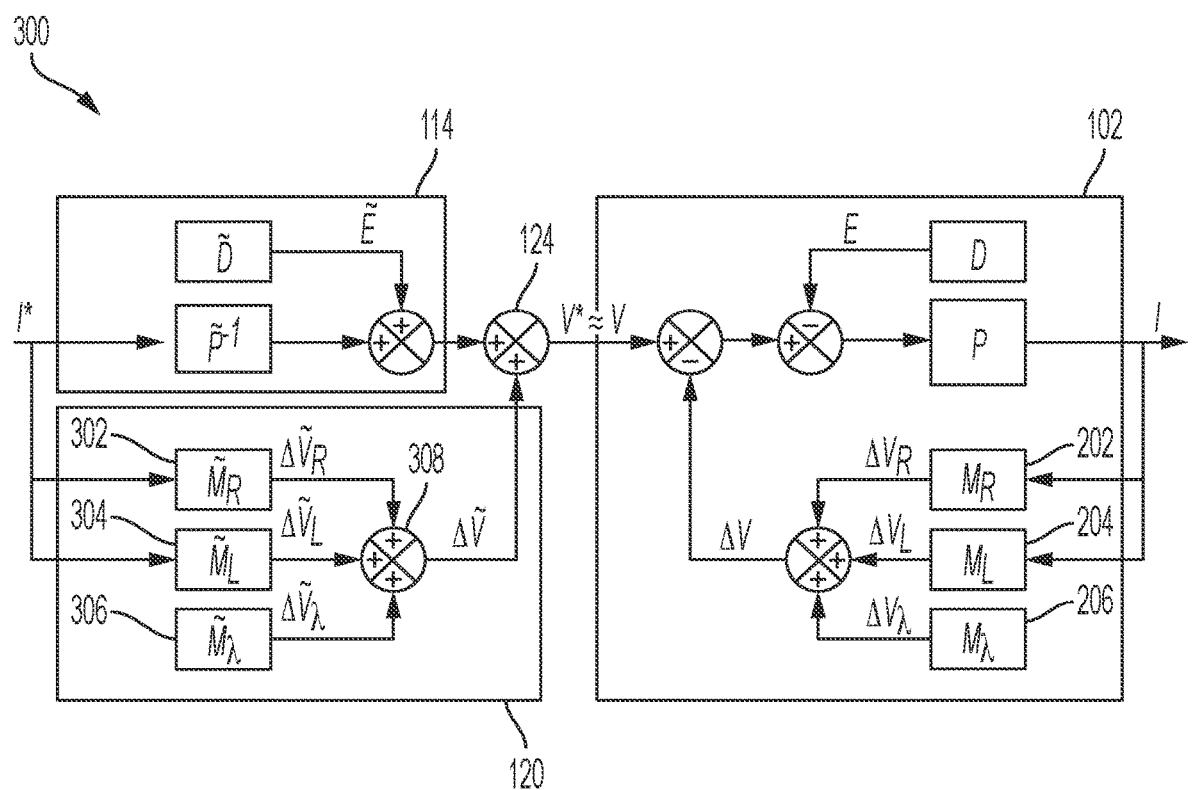
FIG. 3 generally illustrates a parameter imbalance compensator according to the principles of the present disclosure.

FIG. 3 generally illustrates the parameter imbalance compensator 120 compensating for current harmonics induced by parameter imbalance according to the principles of the present disclosure. In some embodiments, the compensator 120 may compensate for the current harmonics induced by parameter imbalance using one or more mathematical models. As shown, the compensator 120 consists of three individual compensators, one corresponding to imbalance in each parameter. The resistance imbalance compensator 302, inductance imbalance compensator 304 and PM flux linkage imbalance compensator 306, symbolized by $\tilde{M}_R$, $\tilde{M}_{LM}$ and $\tilde{M}_\lambda$ respectively, generate corresponding voltage adjustment signal components $\Delta V_R^*$, $\Delta V_{LM}^*$ and $\Delta V_\lambda^*$ respectively, which are then added together at the summation block 308 to compute the final voltage adjustment signal $\Delta V^*$. It should be understood that, while the subscript "dq" has been omitted from the symbols representing different signal vectors, each of the signals consist of a d- and q-axis component.

Figure 4C:
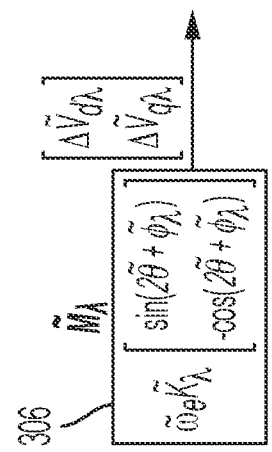
FIG. 4A-4C generally illustrates a controller system according to principles of the present disclosure.
Figure 4A:
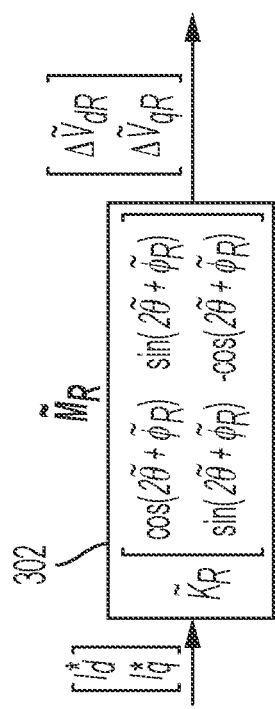
Figure 4B:
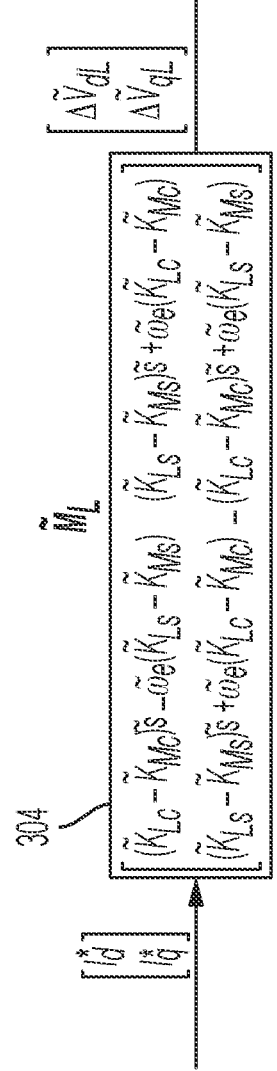

FIG. 4 generally illustrates the detailed implementation of the individual imbalance compensators according to principles of the present disclosure. The resistance imbalance compensator $\tilde{M}_R$ utilizes the current command $I_{dq}^*$, the inductance imbalance compensator $\tilde{M}_{LM}$ utilizes both the current command $I_{dq}^*$ and estimated position $\hat{\theta}$, while the PM flux imbalance compensator utilizes the estimated position $\hat{\theta}$ only, along with estimated control parameter that represent estimates of the corresponding terms in the machine model presented in the foregoing description.

The resistance imbalance compensator 302 determines the voltage adjustment signal component for reducing current harmonics caused by resistance imbalance as follows.

$$\Delta V_{dR}^* = \tilde{K}_R(\cos(2\theta + \tilde{\phi}_R)I_d^* + \sin(2\theta + \tilde{\phi}_R)I_q^*) \quad (16)$$

$$\Delta V_{qR}^* = \tilde{K}_R(\sin(2\theta + \tilde{\phi}_R)I_d^* - \cos(2\theta + \tilde{\phi}_R)I_q^*)$$

$$\begin{bmatrix} \Delta V_{dR}^* \\ \Delta V_{qR}^* \end{bmatrix} = \tilde{M}_R \begin{bmatrix} I_d^* \\ I_q^* \end{bmatrix}$$

$$\tilde{M}_R = \begin{bmatrix} \cos(2\theta + \tilde{\phi}_R) & \sin(2\theta + \tilde{\phi}_R) \\ \sin(2\theta + \tilde{\phi}_R) & -\cos(2\theta + \tilde{\phi}_R) \end{bmatrix}$$

where $\tilde{K}_R$ and $\tilde{\phi}_R$ represent estimates of the corresponding quantities in the machine model specified in equation (7).

The inductance imbalance compensator 304 determines the voltage adjustment signal component for reducing current harmonics caused by resistance imbalance as follows.

$$\Delta V_{dL}^* = ((\tilde{K}_{Lc} - \tilde{K}_{Mc})s - \omega_e(\tilde{K}_{Ls} - \tilde{K}_{Ms}))I_d^* + \quad (17)$$
$$((\tilde{K}_{Ls} - \tilde{K}_{Ms})s + \omega_e(\tilde{K}_{Lc} - \tilde{K}_{Mc}))I_q^*$$

$$\Delta V_{qL}^* = ((\tilde{K}_{Lc} - \tilde{K}_{Mc})s + \omega_e(\tilde{K}_{Ls} - \tilde{K}_{Ms}))I_d^* + $$
$$(-(\tilde{K}_{Ls} - \tilde{K}_{Ms})s + \omega_e(\tilde{K}_{Lc} - \tilde{K}_{Mc}))I_q^*$$

$$\tilde{K}_{Lc} = \tilde{K}_L \cos(2\theta + \tilde{\phi}_L)$$

$$\tilde{K}_{Ls} = \tilde{K}_L \sin(2\theta + \tilde{\phi}_L)$$

$$\tilde{K}_{Mc} = \tilde{K}_M \cos(2\theta + \tilde{\phi}_M)$$

$$\tilde{K}_{Ms} = \tilde{K}_M \sin(2\theta + \tilde{\phi}_M)$$

$$\begin{bmatrix} \Delta V_{dL}^* \\ \Delta V_{qL}^* \end{bmatrix} = \tilde{M}_L \begin{bmatrix} I_d^* \\ I_q^* \end{bmatrix}$$

$$\tilde{M}_L = \begin{bmatrix} (\tilde{K}_{Lc} - \tilde{K}_{Mc})s - \omega_e(\tilde{K}_{Ls} - \tilde{K}_{Ms}) & s(\tilde{K}_{Ls} - \tilde{K}_{Ms}) + \omega_e(\tilde{K}_{Lc} - \tilde{K}_{Mc}) \\ (\tilde{K}_{Ls} - \tilde{K}_{Ms})s + \omega_e(\tilde{K}_{Lc} - \tilde{K}_{Mc}) & s(\tilde{K}_{Lc} - \tilde{K}_{Mc}) + \omega_e(\tilde{K}_{Ls} - \tilde{K}_{Ms}) \end{bmatrix}$$

where $\tilde{K}_L$, $\tilde{\phi}_L$ and $\tilde{K}_M$, $\tilde{\phi}_M$ represent estimates of the quantities corresponding to self-inductance and mutual-inductance imbalance respectively specified in equations (11) and (12), and s represents an approximation of the derivative operation. The exact model of the derivative term (in terms of the true derivative operator s) that may be suitable for a system level analysis depends on the design selected for implementation in a microcontroller.

The PM flux linkage imbalance compensator 306 determines the voltage adjustment signal component for reducing current harmonics caused by PM flux linkage imbalance as follows.

$$\Delta V_{d\lambda}^* = \omega_e \tilde{K}_\lambda \sin(2\theta + \tilde{\phi}_\lambda) \quad (18)$$

$$\Delta V_{q\lambda}^* = -\omega_e \tilde{K}_\lambda \cos(2\theta + \tilde{\phi}_\lambda)$$

$$\begin{bmatrix} \Delta V_{d\lambda}^* \\ \Delta V_{q\lambda}^* \end{bmatrix} = \tilde{M}_\lambda$$

$$\tilde{M}_\lambda = \omega_e \tilde{K}_\lambda \begin{bmatrix} \sin(2\theta + \tilde{\phi}_\lambda) \\ -\cos(2\theta + \tilde{\phi}_\lambda) \end{bmatrix}$$

where $\tilde{K}_\lambda$ and $\tilde{\phi}_\lambda$ represent estimates of the corresponding quantities in the machine model specified in equation (14).

The different parameter estimates utilized in the parameter imbalance compensator 120 as described in equations (16), (17) and (18) may be obtained using either offline (e.g., at the end of assembly line during manufacturing) or in real-time using various learning algorithms and techniques.

In some embodiments, the parameter imbalance compensator 120 may have access to a machine model that has been trained to determine a voltage adjustment signal using estimated parameter imbalance values and received input data. As will be described in detail below, the parameter imbalance compensator 120 may receive input data and may use the machine model (configured with the estimated parameter imbalance values) to determine the voltage adjustment signal. The parameter imbalance compensator 120 may then use the voltage adjustment signal to compensate for the current harmonics induced by parameter imbalance.

In some embodiments, the current command generator 112 may generate and provide a command current signal to the current controller 114 and the parameter imbalance compensator 120. The current controller 114 may use the command current signal to generate a command voltage signal that includes a sinusoidal component when current harmonics induced by parameter imbalance is present. As will be shown, the parameter imbalance compensator 120 may use a machine model to determine a voltage adjustment value and to generate a voltage adjustment signal corresponding to the determined adjustment value.

The machine model may be configured to transform current to voltage. Additionally, or alternatively, the machine model may be configured with and/or trained using a set of estimated parameter imbalance values. The set of estimated parameter imbalance values may, for example, include an inductance parameter imbalance estimate, a flux linkage parameter imbalance estimate, a resistance parameter imbalance estimate, and/or the like.

In some embodiments, the machine model may be trained to model the effects of inter-phase parameter imbalance. This is because the generated command current may have varying characteristics depending on the particular phase (e.g., phase a, b, c, etc.). Additionally, or alternatively, the machine model may be trained to model using one or more types of machine configurations. For example, the machine model may include a PM configuration, a wound configuration, a non-salient or salient configuration, a multi-phase configuration, and/or the like. Additionally, or alternatively, the machine model may be trained to compensate for certain non-linear effects. For example, the machine model may be trained to estimate parameter imbalance in a manner that accounts for the effects that saturation and/or temperature can have on the motor 102. In some embodiments, the machine model may be trained such that the model receives particular input values and outputs a voltage adjustment signal value that represents the inverse of the sinusoidal component of the command voltage signal. The inputs to the machine model may include a generated command current and a position estimate signal.

To determine the voltage adjustment value, the parameter imbalance compensator 120 may use the machine model to process the command current signal and the position estimate signal. For example, the parameter imbalance compensator 120 may use the machine model to determine an inverse of an inductance imbalance estimate, an inverse of a flux linkage imbalance estimate, and an inverse of a resistance imbalance estimate. In some embodiments, the parameter imbalance compensator 120 may add each respective estimate to determine the voltage adjustment value. The voltage adjustment value may represent a total of the inverses of each respective parameter imbalance. Furthermore, the voltage adjustment value corresponds to a voltage adjustment signal that may be used to offset the sinusoidal component of the command voltage signal.

In some embodiments, the parameter imbalance compensator 120 may generate the voltage adjustment signal based on the determined voltage adjustment value. In some embodiments, another device or component of the system 100 may generate the voltage adjustment signal. For example, the voltage adjustment signal may be generated by the current controller 114 or by the pulse width modulator 106. In this case, the parameter imbalance compensator 120 may provide the voltage adjustment value to the component or device that will generate the voltage adjustment signal.

In some embodiments, the parameter imbalance compensator 120 may add or apply the voltage adjustment signal to the command voltage signal. For example, the parameter imbalance compensator 120 may add or apply the voltage adjustment signal to the command voltage signal to form a final command voltage. The final command voltage may be provided to the pulse width modulator 106, which may operate the inverter 104 of the system 100. Because the sinusoidal component of the command voltage signal has been offset using the voltage adjustment signal, the final command voltage excludes the current harmonics induced by parameter imbalance.

In some embodiments, the parameter imbalance compensator 120 may determine the voltage adjustment value and/or generate the voltage adjustment signal in real-time or near real-time. For example, the parameter imbalance compensator 120 may, over time, iteratively determine and/or modify the parameters that may be used to determine the voltage adjustment value (and/or generate the voltage adjustment signal). Additionally, or alternatively, these parameters may be determined at end-of-line (EOL) manufacturing plants and/or related locations.

In this way, the current controller 114 compensates for the sinusoidal component of the command voltage signal, thereby eliminating the current harmonics induced by parameter imbalance.

Figure 5:
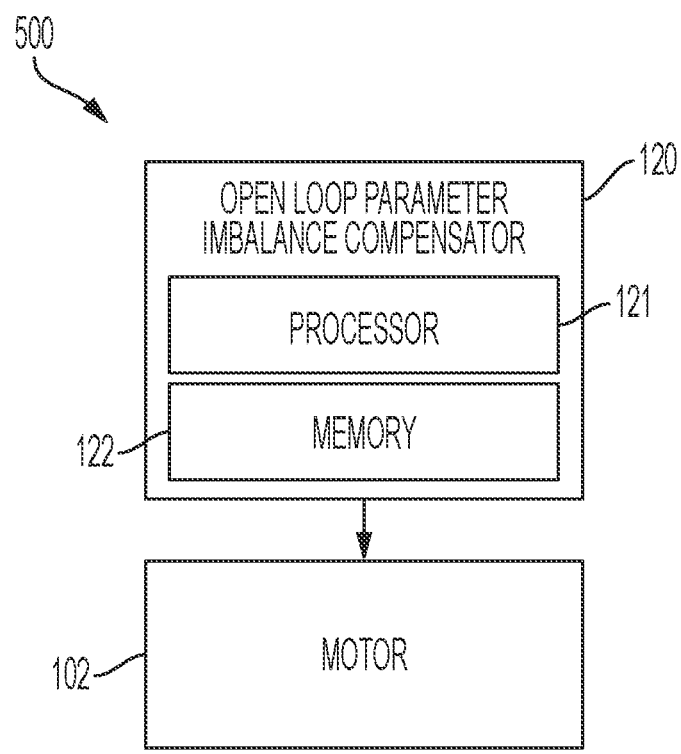
FIG. 5 generally illustrates a controller system according to principles of the present disclosure.

FIG. 5 generally illustrates a controller system 500 according to the principles of the present disclosure. The controller system 500 includes the parameter imbalance compensator 120 communicatively coupled to the motor 102. In some embodiments, the system 100 may include one or more parameter imbalance compensators 120. A parameter imbalance compensator 120 may include an electronic control unit (ECU) and/or any other suitable controller. The parameter imbalance compensator 120 may be configured to control, for example, various aspects of a vehicle, such as aspect of the system 100, aspects of an electronic power steering (EPS) system, and/or the like. Use of the term "compensation" in the parameter imbalance compensator 120 is not intended to limit the types of implementable controllers in any way. Rather, the term "compensation" is used to add clarity in distinguishing the parameter imbalance compensator 120 and the current controller 114.

In some embodiments, the parameter imbalance compensator 120 may include a processor 121 and a memory 122. The processor 121 may include any suitable processor, such as those described herein. Additionally, or alternatively, the parameter imbalance compensator 120 may include any suitable number of processors, in addition to or other than the processor 121. The memory 122 may comprise a single disk or a plurality of disks (e.g., hard drives), and includes a storage management module that manages one or more partitions within the memory 122. In some embodiments, memory 122 may include flash memory, semiconductor (solid state) memory or the like. The memory 122 may include Random Access Memory (RAM), a Read-Only Memory (ROM), or a combination thereof. The memory 122 may include instructions that, when executed by the processor 121, cause the processor 121 to, at least, control various functions of the system 100.

In some embodiments, the parameter imbalance compensator 120 may be configured to perform closed-loop compensation of current harmonics induced by parameter imbalances. For example, the parameter imbalance compensator 120 may receive and read an output current signal. The current estimator 118 may generate the output current signal and communicate the signal to the current controller 114. An output voltage signal corresponding to the output current signal may include a constant part with a negligible sinusoidal part, while the output current signal may include a constant part and a sinusoidal part.

The parameter imbalance compensator 120 may determine whether the output current signal includes a constant part and a sinusoidal part. If the parameter imbalance compensator 120 determines that the output current signal includes only a constant part, then there may be no parameter imbalance because the sinusoidal part of the output current signal represents the current harmonics that represent the signature of parameter imbalance in the synchronous motor.

Conversely, if the parameter imbalance compensator 120 determines that the output current signal includes the constant part and the sinusoidal part, then the parameter imbalance compensator 120 is able to identify the presence of current harmonics induced by parameter imbalance in the system 100. The parameter imbalance compensator 120 may determine a voltage adjustment signal, as described in detail herein, to compensate for the sinusoidal component of the command voltage signal (which represents the parameter imbalance).

In some embodiments, the parameter imbalance compensator 120 may compensate for the current harmonics induced by the parameter imbalance in a closed loop using an open loop path. In some embodiments, the parameter imbalance compensator 120 may compensate for the parameter imbalance in real-time (e.g., in less than 2 seconds) as the system 100 operates the motor 102.

The parameter imbalance compensator 120 may apply the voltage adjustment signal to a base command voltage to output a final command voltage to the pulse width modulator 106. The pulse width modulator 106 operates the inverter 104 such that the voltage applied to the motor 102 causes the current harmonics induced by parameter imbalance to be suppressed and/or eliminated from the output current signal.

In some embodiments, the system 500 may perform the methods described herein. However, the methods described herein as performed by the system 500 are not meant to be limiting, and any type of software executed on a controller can perform the methods described herein without departing from the scope of this disclosure. For example, a controller, such as a processor executing software within a computing device, can perform the methods described herein.

Figure 6:
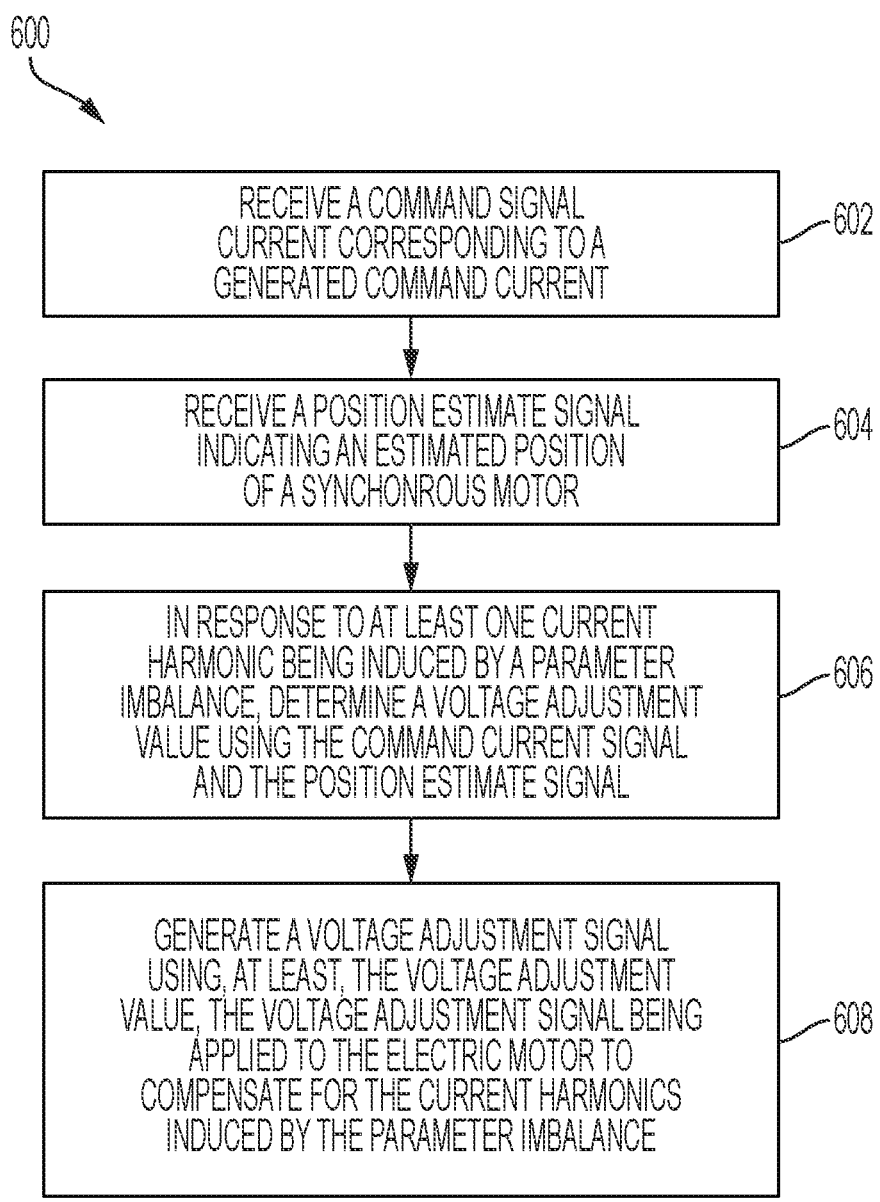
FIG. 6 is a flow diagram generally illustrating a method for open loop compensation of current harmonics induced by machine imbalances in synchronous motor drives according to principles of the present disclosure.

FIG. 6 is a flow diagram generally illustrating a method 600 for an open loop compensation of current harmonics induced by machine imbalances in synchronous motor drives according to principles of the present disclosure. At 602, the method 600 receives a command signal current corresponding to a generated command current. For example, the parameter imbalance compensator 120 receives the command signal current corresponding to the generated command current.

At 604, the method 600 receives a position estimate signal indicating an estimated position of a synchronous motor. For example, the parameter imbalance compensator 120 receives a position estimate signal indicating an estimated position of the electric motor 102.

In response to at least one current harmonic being induced by a parameter imbalance, at 606, the method 600 determines a voltage adjustment value using the command current signal and the position estimate signal. For example, the parameter imbalance compensator 120 determines a voltage adjustment value using the command current signal and the position estimate signal.

At 608, the method 600 generates a voltage adjustment signal using, at least, the voltage adjustment value, the voltage adjustment signal being applied to the synchronous motor to compensate for the current harmonics induced by the parameter imbalance. For example, the parameter imbalance compensator 120 generates a voltage adjustment signal using, at least, the voltage adjustment value, the voltage adjustment signal being applied to the electric motor to compensate for the current harmonics induced by the parameter imbalance. In some embodiments, another component of the synchronous motor drive system (e.g., the system 100) may generate the voltage adjustment signal. For example, the parameter imbalance compensator 120 may provide the voltage adjustment value to another component of the system 100, such as the current controller 114, the pulse width modulator 106, or the inverter 104, and said component may generate the voltage adjustment signal based on the voltage adjustment value. In some embodiments, the voltage adjustment signal may be used to compensate for the current harmonics induced by parameter imbalance by being added to or applied to the command voltage signal (e.g., which is generated by the current controller 114). In some embodiments, adding or applying the voltage adjustment signal to the command voltage signal may form a final command voltage that may be provided to the pulse width modulator 106. The pulse width modulator 106 operates the inverter 104 such that the final command voltage may be applied to the motor 102 such that the current harmonics induced by parameter imbalance is suppressed or eliminated from the output current signal generated by the motor 102.

In some embodiments, a system for compensating parameter imbalance induced current harmonics in an electric motor includes a processor and a memory. The memory includes instructions that, when executed by the processor, cause the processor to: receive a command current signal corresponding to a generated command current; receive a position estimate signal indicating an estimated position of the electric motor; in response to at least one current harmonic being induced by a parameter imbalance, determine a voltage adjustment value using the command current signal and the position estimate signal; and generate a voltage adjustment signal using, at least, the voltage adjustment value, the voltage adjustment signal being applied to the electric motor to compensate for the current harmonics induced by the parameter imbalance.

In some embodiments, the voltage adjustment value is determined based on an inverse of one or more parameter imbalance values representing a sinusoidal part of a command voltage signal. In some embodiments, the voltage adjustment signal is added to the command voltage signal prior to being applied to the electric motor, wherein adding the voltage adjustment signal to the electric motor command voltage signal offsets a sinusoidal part of the command voltage signal. In some embodiments, the one or more parameter imbalance values include a parameter imbalance estimate, a flux linkage parameter imbalance estimate, and a resistance parameter imbalance estimate. In some embodiments, the voltage adjustment signal being applied to the electric motor is applied using an open loop path. In some embodiments, the instructions further cause the processor to use a machine model to determine one or more parameter imbalance estimates, determine inverses of each respective parameter imbalance estimate, and determine the voltage adjustment signal based on the inverses of the one or more parameter imbalance estimates. In some embodiments, the machine model is trained using at least one of one or more saturation estimations, one or more temperature estimations, and one or more inter-phase variation estimates relating to an inter-phase variation of a particular parameter imbalance.

In some embodiments, a method for compensating parameter imbalance induced current harmonics in a synchronous motor drive includes receiving a command current signal corresponding to a generated command current. The method also includes receiving a position estimate signal indicating an estimated position of the synchronous motor drive and, in response to at least one current harmonic being induced by a parameter imbalance, determining a voltage adjustment value using the command current signal and the position estimate signal. The method also includes generating a voltage adjustment signal using, at least, the voltage adjustment value, the voltage adjustment signal being applied to the synchronous motor drive to compensate for the current harmonics induced by the parameter imbalance.

In some embodiments, determining the voltage adjustment value includes determining the voltage adjustment value based on an inverse of one or more parameter imbalance values representing a sinusoidal part of a command voltage signal. In some embodiments, the voltage adjustment signal is added to the command voltage signal prior to being applied to the synchronous motor drive, wherein adding the voltage adjustment signal to the command voltage signal offsets a sinusoidal part of the command voltage signal. In some embodiments, the one or more parameter imbalance values include a parameter imbalance estimate, a flux linkage parameter imbalance estimate, and a resistance parameter imbalance estimate. In some embodiments, the voltage adjustment signal being applied to the electric motor is applied using an open loop path. In some embodiments, the method also includes using a machine model to determine one or more parameter imbalance estimates, determining inverses of each respective parameter imbalance estimate, and determining the voltage adjustment signal based on the inverses of the one or more parameter imbalance estimates. In some embodiments, the machine model is trained using at least one of one or more saturation estimations, one or more temperature estimations, and one or more inter-phase variation estimates relating to an inter-phase variation of a particular parameter imbalance.

In some embodiments, an apparatus includes a processor and a memory. The memory includes instructions that, when executed by the processor, cause the processor to: receive a command current signal corresponding to a generated command current; receive a position estimate signal indicating an estimated position of an electric motor; in response to at least one current harmonic being induced by a parameter imbalance, determine a voltage adjustment value using the command current signal and the position estimate signal; and generate a voltage adjustment signal using, at least, the voltage adjustment value, the voltage adjustment signal being applied to the electric motor to compensate for the current harmonics induced by the parameter imbalance.

In some embodiments, the voltage adjustment value is determined based on an inverse of one or more parameter imbalance values representing a sinusoidal part of a command voltage signal. In some embodiments, the voltage adjustment signal is added to the command voltage signal prior to being applied to the electric motor, wherein adding the voltage adjustment signal to the command voltage signal offsets a sinusoidal part of the command voltage signal. In some embodiments, the voltage adjustment signal being applied to the electric motor is applied using an open loop path. In some embodiments, the instructions further cause the processor to use a machine model to determine one or more parameter imbalance estimates, determine inverses of each respective parameter imbalance estimate, and determine the voltage adjustment signal based on the inverses of the one or more parameter imbalance estimates. In some embodiments, the machine model is trained using at least one of one or more saturation estimations, one or more temperature estimations, and one or more inter-phase variation estimates relating to an inter-phase variation of a particular parameter imbalance.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A system for compensating parameter imbalance induced current harmonics in an electric motor, the system comprising:
 a processor; and
 a memory that includes instructions that, when executed by the processor, cause the processor to:

receive a command current signal corresponding to a generated command current;

receive a position estimate signal indicating an estimated position of the electric motor;

in response to at least one current harmonic being induced by a parameter imbalance, determine a voltage adjustment value using the command current signal and the position estimate signal, wherein the voltage adjustment value is determined based on an inverse of one or more parameter imbalance values representing a sinusoidal part of a command voltage signal; and generate a voltage adjustment signal using, at least, the voltage adjustment value, the voltage adjustment signal being applied to the electric motor to compensate for the current harmonics induced by the parameter imbalance.

2. The system of claim 1, wherein the inverse of the one or more parameter imbalance values corresponds to an inverse mathematical model of the electric motor.

3. The system of claim 1, wherein the voltage adjustment signal is added to the command voltage signal prior to being applied to the electric motor, wherein adding the voltage adjustment signal to the command voltage signal offsets the sinusoidal part of the command voltage signal.

4. The system of claim 1, wherein the one or more parameter imbalance values include an inductance parameter imbalance estimate, a flux linkage parameter imbalance estimate, and a resistance parameter imbalance estimate.

5. The system of claim 1, wherein the voltage adjustment signal being applied to the electric motor is applied using an open loop path.

6. The system of claim 1, wherein the instructions further cause the processor to:

use a machine model to determine one or more parameter imbalance estimates;

determine inverses of each respective parameter imbalance estimate; and determine the voltage adjustment signal based on the inverses of the one or more parameter imbalance estimates.

7. The system of claim 6, wherein the machine model is trained using one or more saturation estimations.

8. A method for compensating parameter imbalance induced current harmonics in a synchronous motor drive, the method comprising:

receiving a command current signal corresponding to a generated command current;

receiving a position estimate signal indicating an estimated position of the synchronous motor drive;

in response to at least one current harmonic being induced by a parameter imbalance, determining a voltage adjustment value using the command current signal and the position estimate signal, wherein determining the voltage adjustment value comprises determining the voltage adjustment value based on an inverse of one or more parameter imbalance values representing a sinusoidal part of a command voltage signal; and generating a voltage adjustment signal using, at least, the voltage adjustment value, the voltage adjustment signal being applied to the synchronous motor drive to compensate for the at least one current harmonic induced by the parameter imbalance.

9. The method of claim 8, wherein the voltage adjustment signal is added to the command voltage signal prior to being applied to the synchronous motor drive, wherein adding the voltage adjustment signal to the command voltage signal offsets a sinusoidal part of the command voltage signal.

10. The method of claim 8, wherein the inverse of the one or more parameter imbalance values corresponds to an inverse mathematical model of the synchronous motor drive.

11. The method of claim 8, wherein the one or more parameter imbalance values include an inductance parameter imbalance estimate, a flux linkage parameter imbalance estimate, and a resistance parameter imbalance estimate.

12. The method of claim 8, wherein the voltage adjustment signal being applied to the synchronous motor drive is applied using an open loop path.

13. The method of claim 8, further comprising:

using a machine model to determine one or more parameter imbalance estimates;

determining inverses of each respective parameter imbalance estimate; and determining the voltage adjustment signal based on the inverse of the one or more parameter imbalance estimates.

14. The method of claim 13, wherein the machine model is trained using one or more saturation estimations.

15. An apparatus comprising:

a processor; and a memory that includes instructions that, when executed by the processor, cause the processor to:

receive a command current signal corresponding to a generated command current;

receive a position estimate signal indicating an estimated position of an electric motor;

in response to at least one current harmonic being induced by a parameter imbalance, determine a voltage adjustment value using the command current signal and the position estimate signal, wherein the voltage adjustment value is determined based on an inverse of one or more parameter imbalance values representing a sinusoidal part of a command voltage signal; and generate a voltage adjustment signal using, at least, the voltage adjustment value, the voltage adjustment signal being applied to the electric motor to compensate for the at least one current harmonic induced by the parameter imbalance.

16. The apparatus of claim 15, wherein the inverse of the one or more parameter imbalance values corresponds to an inverse mathematical model of the electric motor.

17. The apparatus of claim 15, wherein the voltage adjustment signal is added to the command voltage signal prior to being applied to the electric motor, wherein adding the voltage adjustment signal to the command voltage signal offsets the sinusoidal part of the command voltage signal.

18. The apparatus of claim 15, wherein the voltage adjustment signal being applied to the electric motor is applied using an open loop path.

19. The apparatus of claim 15, wherein the instructions further cause the processor to:

use a machine model to determine one or more parameter imbalance estimates;

determine inverses of each respective parameter imbalance estimate; and determine the voltage adjustment signal based on the inverses of the one or more parameter imbalance estimates.

20. The apparatus of claim 19, wherein the machine model is trained using one or more saturation estimations.

* * * * *